Feb. 24, 1959 F. SPIECKER 2,875,280

AUTOMATIC TELEPHONE SYSTEM

Filed Feb. 20, 1953 8 Sheets-Sheet 1

Inventor:
Friedrich Spiecker
By [signature] Atty.

Feb. 24, 1959 F. SPIECKER 2,875,280

AUTOMATIC TELEPHONE SYSTEM

Filed Feb. 20, 1953 8 Sheets-Sheet 2

Inventor:
Friedrich Spiecker.
By. [signature] Atty.

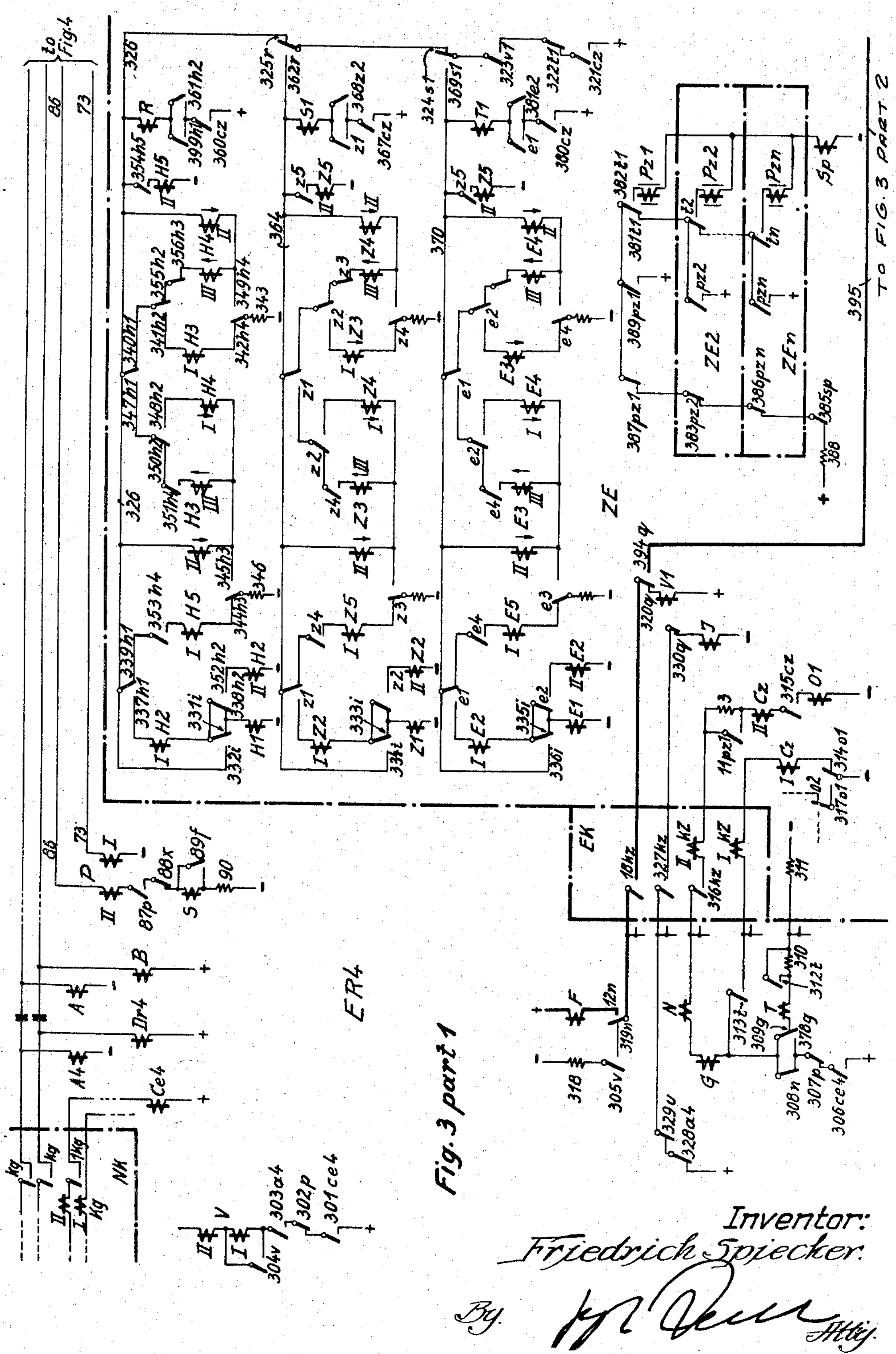
Fig. 3 part 1
Inventor:
Friedrich Spiecker
By [signature] Atty.

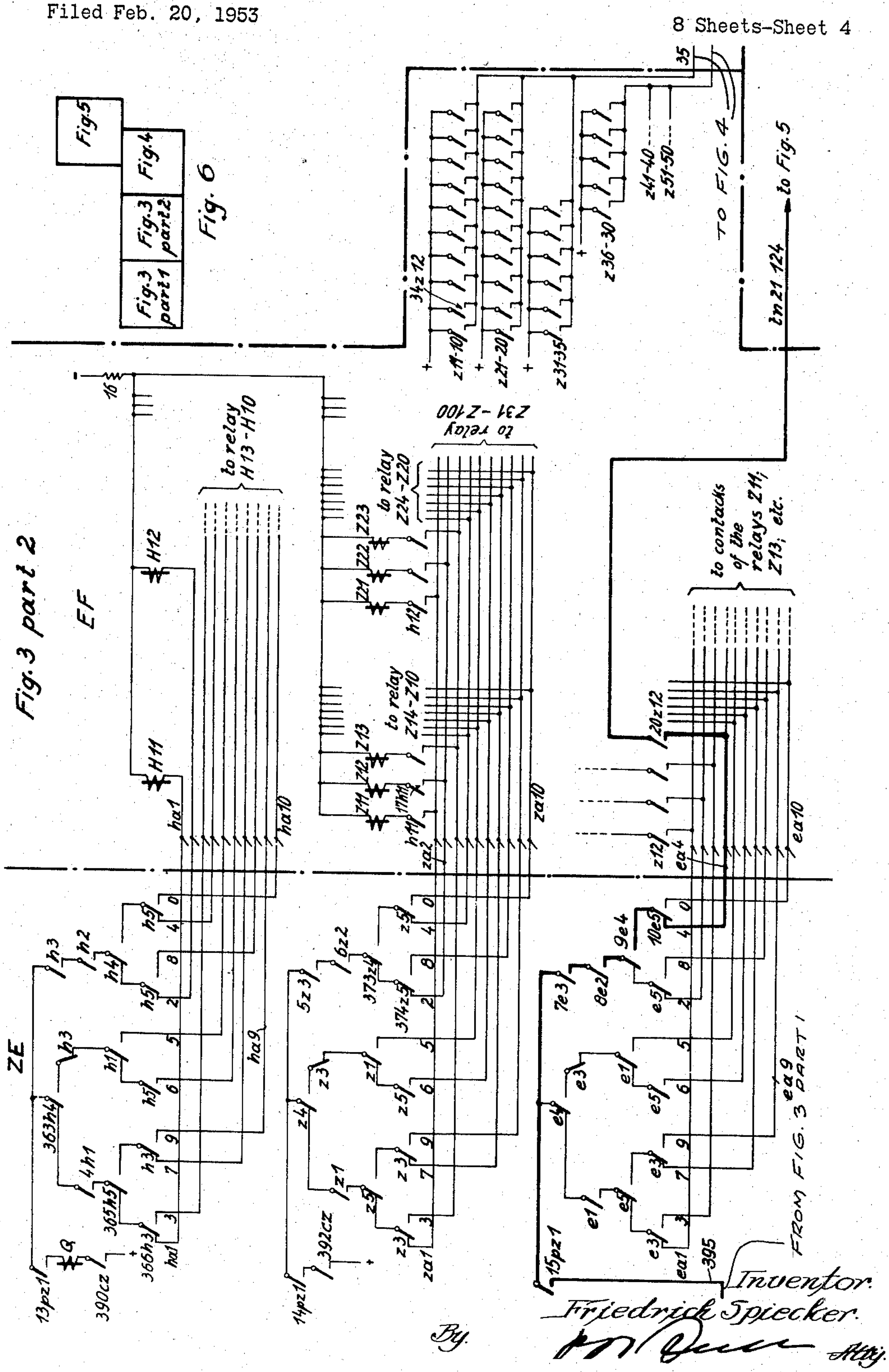
Fig. 6, Fig. 3 part 2
Inventor.
Friedrich Spiecker.
By. [signature] Atty.

Feb. 24, 1959

F. SPIECKER 2,875,280

AUTOMATIC TELEPHONE SYSTEM

Filed Feb. 20, 1953

8 Sheets-Sheet 5

Inventor:
Friedrich Spiecker

By [signature] Atty.

Feb. 24, 1959 F. SPIECKER 2,875,280

AUTOMATIC TELEPHONE SYSTEM

Filed Feb. 20, 1953 8 Sheets-Sheet 6

Inventor:
Friedrich Spiecker.
By. [signature] Atty.

Feb. 24, 1959

F. SPIECKER 2,875,280

AUTOMATIC TELEPHONE SYSTEM

Filed Feb. 20, 1953

8 Sheets-Sheet 7

Inventor:
Friedrich Spiecker
By [signature] Atty.

AUTOMATIC TELEPHONE SYSTEM

Filed Feb. 20, 1953

8 Sheets-Sheet 8

Inventor:
Friedrich Spiecker
By [signature] Atty.

United States Patent Office 2,875,280

Patented Feb. 24, 1959

2,875,280

AUTOMATIC TELEPHONE SYSTEM

Friedrich Spiecker, Berlin-Charlottenburg, Germany, assignor to Siemens & Halske Aktiengesellschaft, Munich, Germany, a corporation of Germany Application February 20, 1953, Serial No. 338,103
In Germany February 7, 1950

Public Law 619, August 23, 1954
Patent expires February 7, 1970

18 Claims. (Cl. 179—18)

This invention relates to signalling systems and is particularly concerned with an automatic telephone system of the relay type.

The object of the invention is to provide a system of the above indicated kind comprising switching means and circuits for fully utilizing connecting devices and trunk lines serving calls to subscribers' lines in principal groups of lines. The switching means and circuits are operative in the final selection stage over which a connecting device, seized by a calling line, is after the dialling of the number of the wanted line connected with such line by means of coupling relays.

In a known system there are many small groups of lines combined to form a principal line group. The traffic to all lines of the principal group is taken care of over a large number of intermediate lines. Each of the small groups of lines can however be reached only over a small number of the intermediate lines associated with the large principal group. It is thus impossible to utilize for calls to every subscriber's line each intermediate line serving the traffic to the corresponding large principal line group; and it follows, therefore, that the available connecting devices and the intermediate lines cannot be fully utilized and their number must consequently be appreciably greater than is warranted by the prevailing traffic conditions.

The invention permits full utilization of the available connecting devices and intermediate lines by subdividing a large main group of subscribers' lines into groups, each of said groups containing a plurality of subgroups, and by providing switching means comprising a plurality of switching devices allocated to said main group, a register, a marker, a plurality of serially related couplers, intermediate lines extending between each two of said couplers, a group coupler allocated to each group of lines, a calling subscriber connected to one of said switching devices for extending a call to a wanted line over said register and said marker, the talking path between the corresponding switching device and the wanted subscriber's line being built up over said serially related couplers and said intermediate lines and the group coupler allocated to the group containing the wanted line, whereby said switching device to which the calling subscriber is connected may be connected with the wanted line over any of said intermediate lines accessible to such switching device.

An embodiment of the invention is shown in the accompanying drawings, it being understood, however that the invention is not strictly limited to the example shown.

Figure 3A:
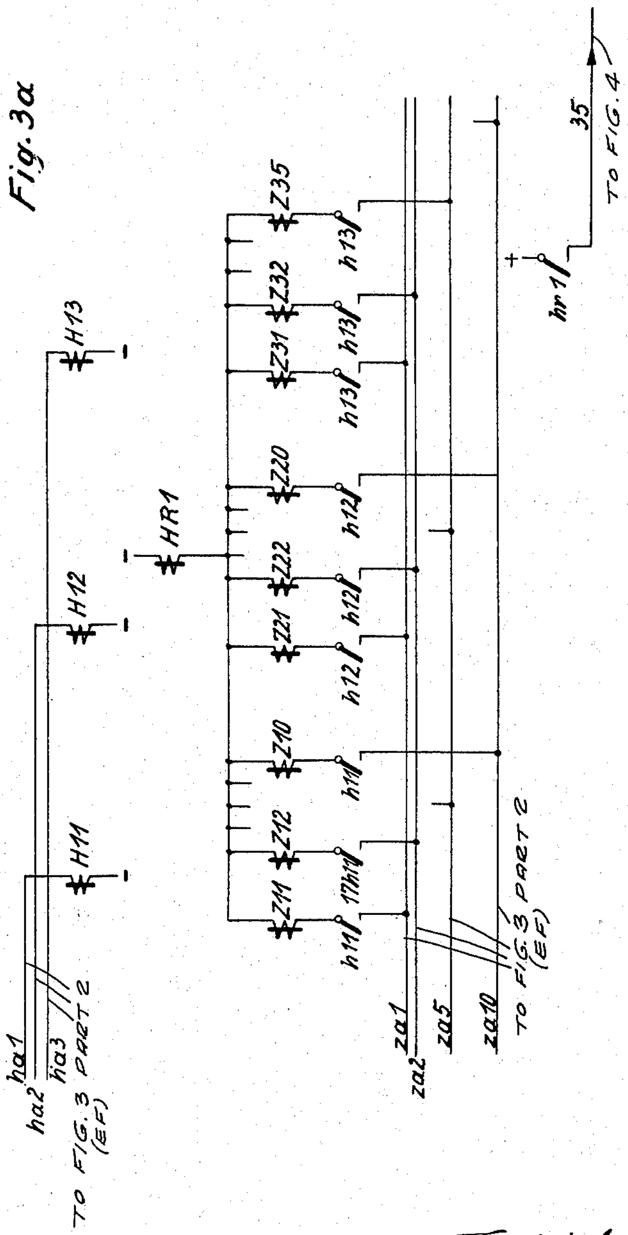
Figure 4:
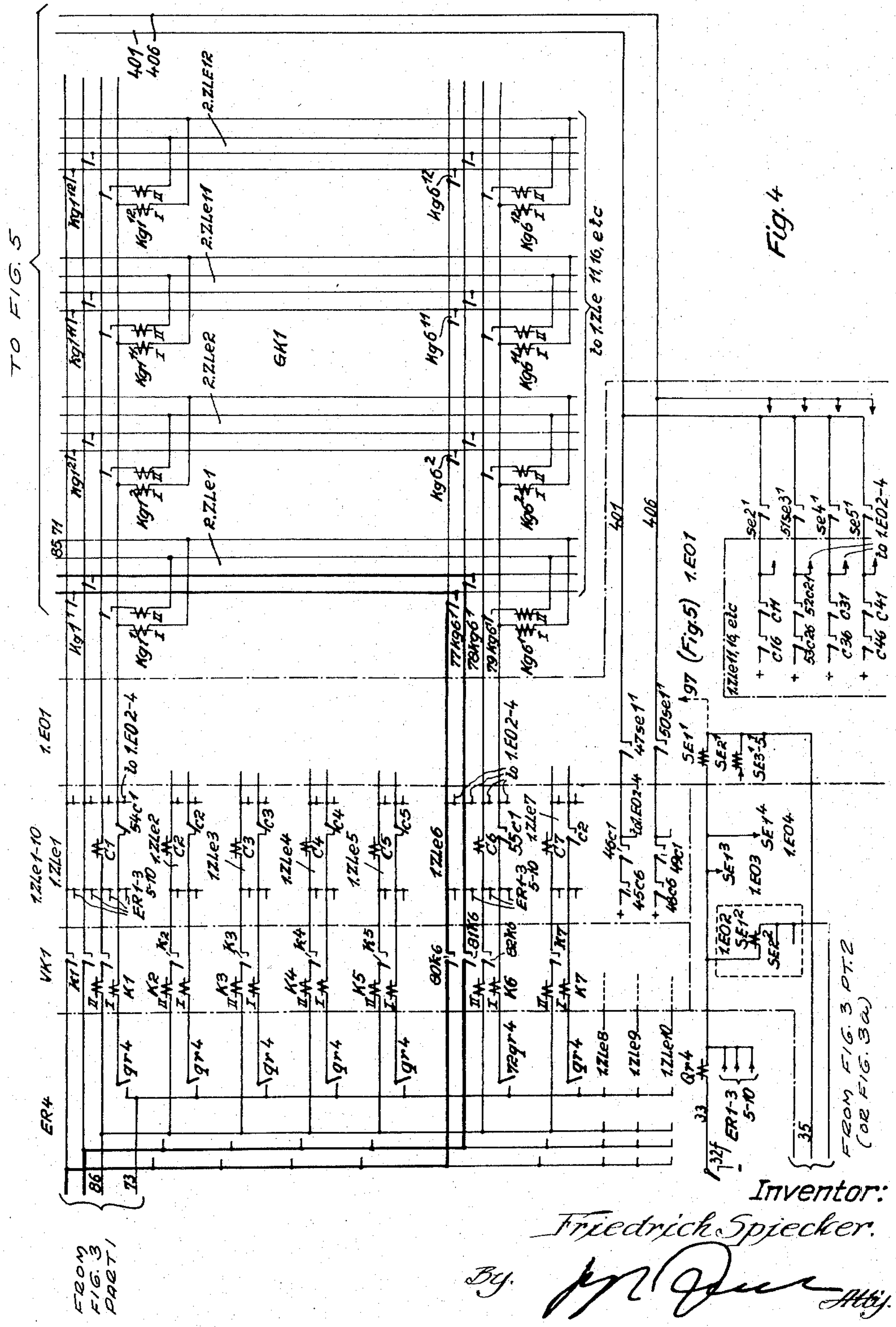
Figure 5:
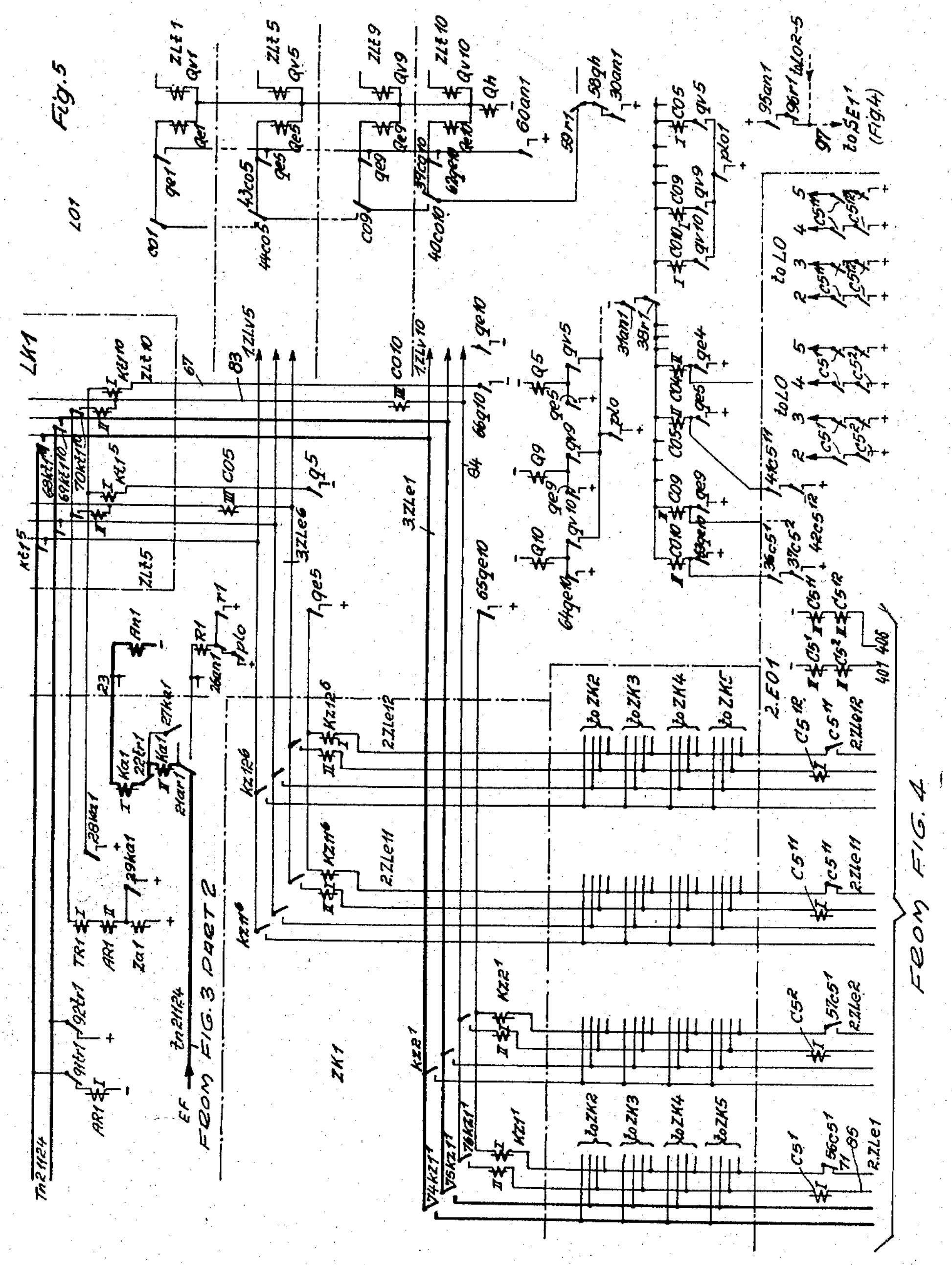
Figure 7:
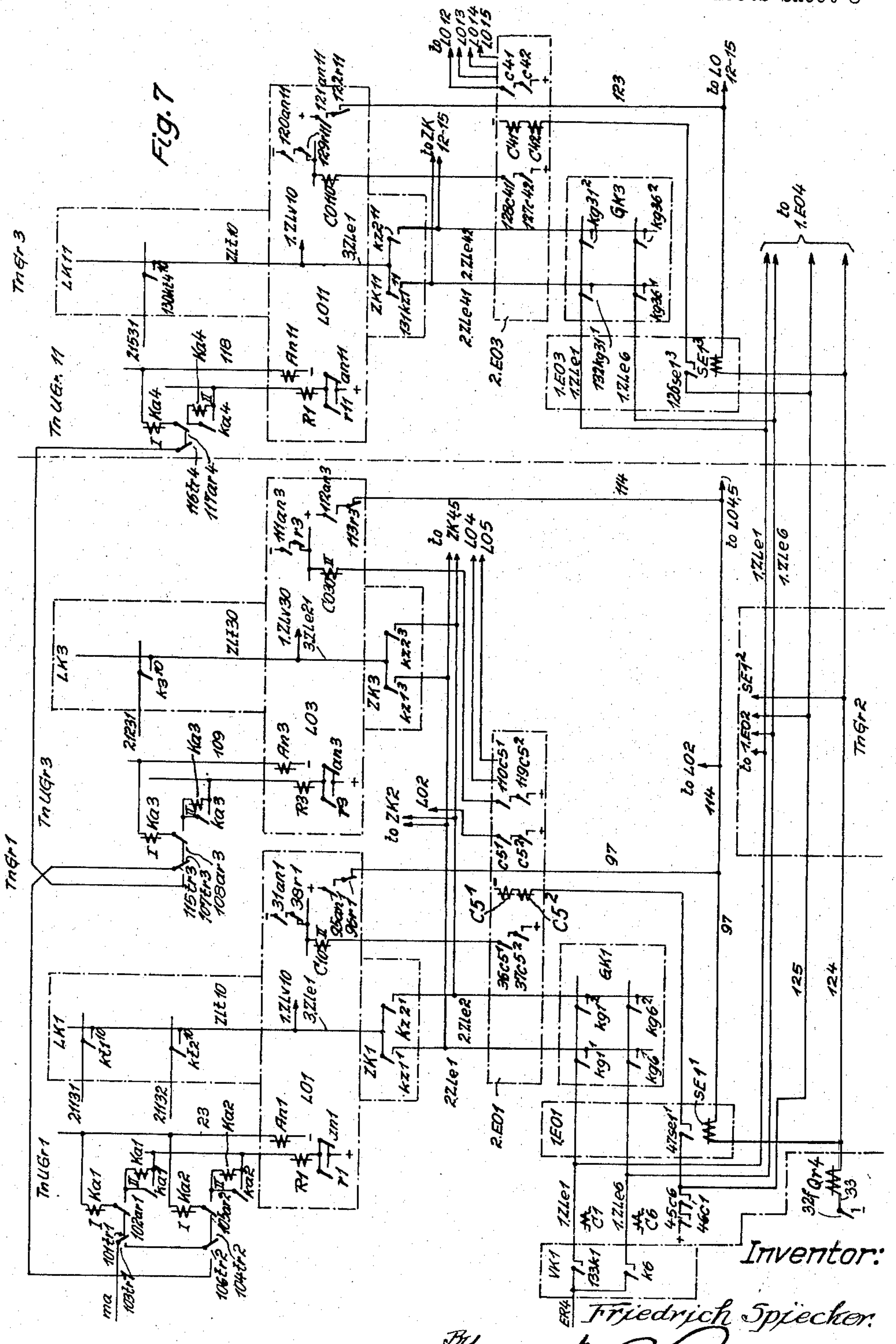

Fig. 3 part 1 and part 2 represent a relay set ER4, a register ZE and a marker EF;

Fig. 3*a* shows a modified circuit for part of the relays of the marker EF shown in Fig. 3 part 2;

Fig. 4 indicates the precoupler VK1, the allotter 1.EO1 and the group coupler GK1;

Fig. 5 illustrates the allotter 2.EO1, the intermediate coupler ZK1, the allotter LO1 and the circuit of a subscriber's line;

Fig. 6 indicates the manner in which the Figs. 3, 4 and 5 are to be arranged; and Fig. 7 shows a P. B. X group, the P. B. X lines being distributed in several line groups and subgroups of lines, respectively.

Figure 1:
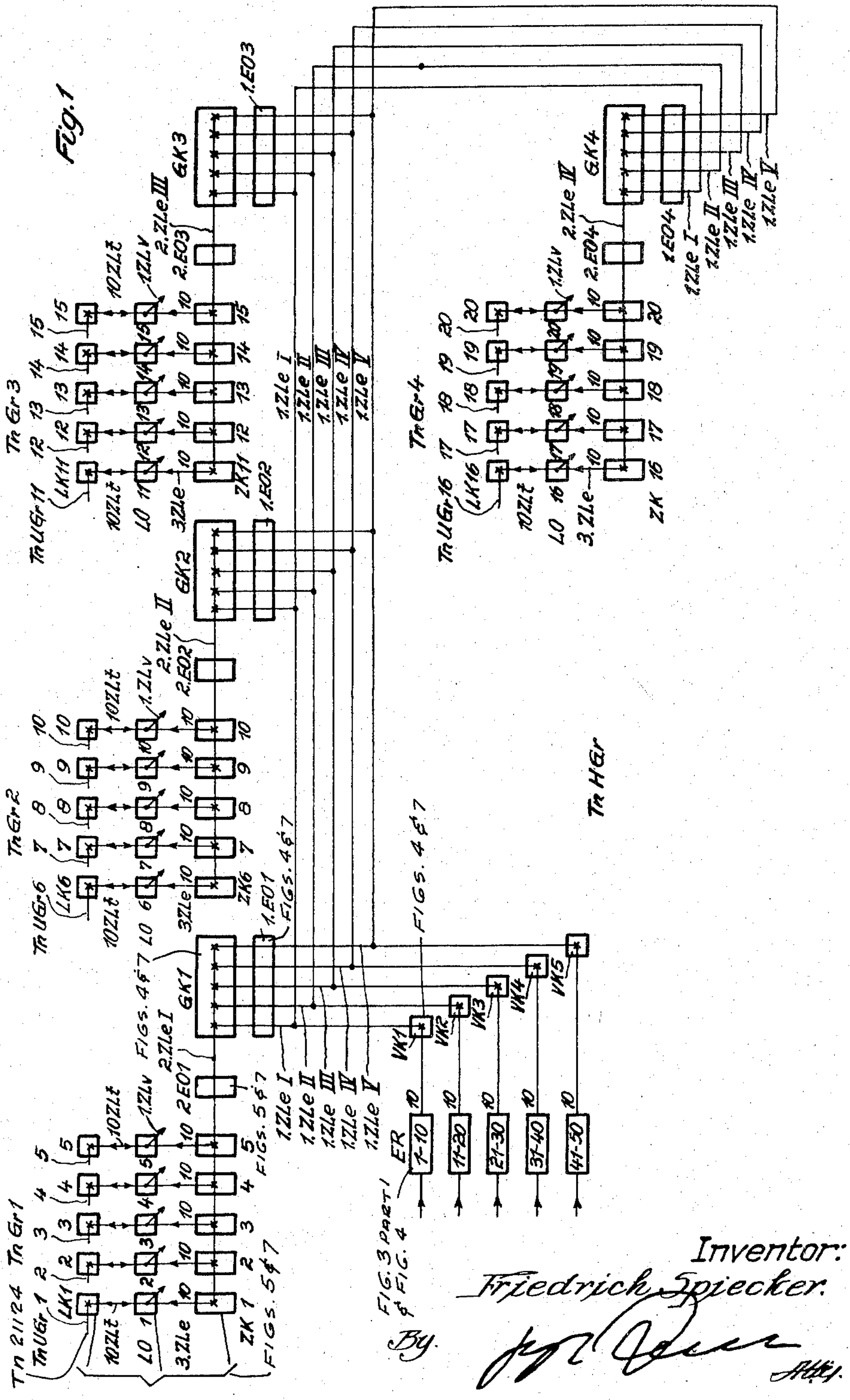
Fig. 1 shows the arrangement and the grouping of the coupling devices, the allotters and the intermediate lines for the final selection stage of a principal or main group comprising four groups each having 250 subscribers' lines.

*Description of Fig. 1*

The subscribers' lines appear in principal or main groups each having 1000 lines. One such main group is shown and designated by reference T*n*HG*r*. If an exchange has a capacity of 1000 lines, such lines form a main group. In larger exchanges, there are several such main groups. A calling subscriber is connected over a group selection stage with a relay set of the main group containing the desired subscriber's line. The connecting devices and intermediate lines of the corresponding main group form in such a case the final selection stage.

Each main group is subdivided into four line groups T*n*G*r*1 . . . T*n*G*r*4 each having 250 subscribers' lines. Each line group comprises five subgroups each having 50 lines. The subgroups T*n*UG*r*1–5 thus form the line group T*n*G*r*1; the subgroups T*n*UG*r*.6–10 form the line group T*n*G*r*2, etc.

The line groups and the subgroups may include a greater or a smaller number of subscribers' lines depending on the traffic requirements.

There are provided 50 connecting devices (relay sets) ER1–10, ER11–20 . . . ER41–50 which serve the calls to the subscribers of a main group. Upon seizure of a relay set by a calling subscriber there is connected a register (not shown in Fig. 1) which contains the digit relays controlled by the dial pulses. Upon completion of the number selection, the wanted subscriber's line is marked over a marker (not shown in Fig. 1) which is individual to the main group. If the selected line is idle, a talking path will be completed wihch connects the selected line with the relay set seized by the calling line.

The 50 relay sets ER1–50 are subdivided into five groups. Each group has access over its own pre-coupler VK to a group of first intermediate lines 1.ZL*e*. The number of first intermediate is equal to the number of relay sets ER. The relay sets ER1–10 form a group. They have access to a group 1.ZL*e*I of 10 first intermediate lines over the pre-coupler VKI.

For each of the line groups T*n*G*r*1–T*n*G*r*4 there is provided a group coupler as indicated at GK1–GK4. Associated with each line group T*n*G*r*1 . . . T*n*G*r*4 are also second intermediate lines 2.ZL*e* which may be coupled by coupling relays in the corresponding group coupler GK with the intermediate lines 1.ZL*e*. The group intermediate lines 2.ZL*e*, although being individual to their associated groups, are nevertheless accessible to all relay sets ER over the pre-couplers VK1–VK5 and over the group coupler that may be in any instance concerned, that is, they are accessible to the relay set ER1–10 over the pre-coupler VK1 and the 10 intermediate lines of the group 1.ZL*e*I.

All intermediate lines 1.ZL*e* extend in parallel to the group couplers GK of all line groups. In the path extended from each group coupler there is provided an allotter EO. In the path extended from the group coupler GK1 there is the allotter 2.EO1; and in the path extended from the group coupler GK2 there is the allotter 2.EO2, etc.

For each of the five subgroups TnUGr of a line group TnGr there are avaliable 10 subscribers' intermediate lines ZLt. Each such intermediate line ZLt is branched off in the allotter LO of its subgroup. One of the branches ZLv serves the outgoing traffic which does not concern the invention, while the incoming traffic is taken care of by the other branch is the intermediate line 3.ZLe of the first selection stage. Over an intermediate coupler, for example ZK1 of the subgroup TnUGr1 will be connected an intermediate line 3.ZLe, which is made available by the allotter LO1, to an intermediate group line 2.ZLe which has access over the group coupler GK1 to the relay set ER that had been seized by the calling subscriber. The making available and seizure of the intermediate lines 1.ZLe, 2.ZLe and 3.ZLe, for example, in a connection to a subscriber in the subgroup TnUGr1 takes place by the co-operation of the allotters 1.EO1, 2.EO1 and LO1.

It will be seen from the foregoing explanations that a relay set ER, for example the set ER4 included in the sets marked ER1–10, has access to each subscriber's line in each subgroup of any line group. While each first intermediate line 1.ZLe cannot be connected with each group intermediate line 2.ZLe and while each of the latter cannot be connected with each intermediate line 3.ZLe, a connection with a selected subscriber can always be established so long as such subscriber can reach an idle subscriber intermediate line ZLt which has access to an idle group intermediate line 2.ZLe.

The incoming traffic in each line group is thus taken care of

First: Over 50 first intermediate lines 1.ZLe which have access in common to all line groups;

Second: Over 20 group intermediate lines 2.ZLe; and

Third: Over 50 intermediate lines 3.ZLe, ten of which are provided exclusively for each subgroup of lines.

The number of first intermediate lines 1.ZLe must be equal to the number of relay sets, so that each subscriber's line, so long as it can reach a group coupler of its group, has access to a relay set from which proceeds the impulse for the completion of the call. If the number of first intermediate lines 1.ZLe were smaller than the number of relay sets ER, it might happen that a selected line is accessible to the associated group coupler GK, over the intermediate coupler ZK, but that the relay set ER (from which the marker impulse proceeds) is not available due to busy condition of all first intermediate lines 1.ZLe which are available to it.

In order to take care of the traffic load assumed in the example shown, 15 or 16 intermediate lines 2.ZLe, available to a subgroup TnUGr, 5 would have access would be sufficient for each line group TnGr of 250 subscribers' lines, provided that traffic from neighboring groups would not have to be considered. It would then be possible, as clearly indicated in Fig. 2, to save in each group coupler EGK 40–50 coupling relays and in each intermediate coupler EZK 4–5 coupling relays. However, of the 10 third intermediate lines 3.ZLe, available to a subgroup TnUGr, 5 would have access only to one group intermediate line 2.ZLe. Such a grouping is in view of busy conditions unsuitable. The intermediate lines 3.ZLe which may be coupled only with one group intermediate lines 2.ZLe will often be busy at times when the group intermediate lines available to them are busy by connections with subscribers' lines of other subgroups. These intermediate lines 3.ZLe therefore would be insufficiently utilized. The consequence would be that the number of incompleted calls due to busy conditions of connecting paths would be excessive. If it were desired to reduce the number of incompleted connections while using 15–16 group intermediate lines 2.ZLe, it would be necessary to increase the number of third intermediate lines 3.ZLe perhaps by 20%. Not 10 but 12 intermediate lines 3.ZLe would then be required for each subgroup of lines. The number of coupling relays for subgroups each with 50 lines would then increase in each line coupler by 100 relays. If only the number of coupling relays in each line group of 250 lines is considered, it will be seen, that the saving of 50 coupling relays in the group coupler GK and 5×5=25 coupling relays in the intermediate coupler ZK is to be compared with an additional expenditure of 5×100=500 coupling relays in the line couplers and at least 5×2=10 coupling relays in the intermediate couplers ZK. It is therefore more economical, as proposed by the invention, to provide more group intermediate lines than would be required by the prevailing traffic requirements.

Figure 2:
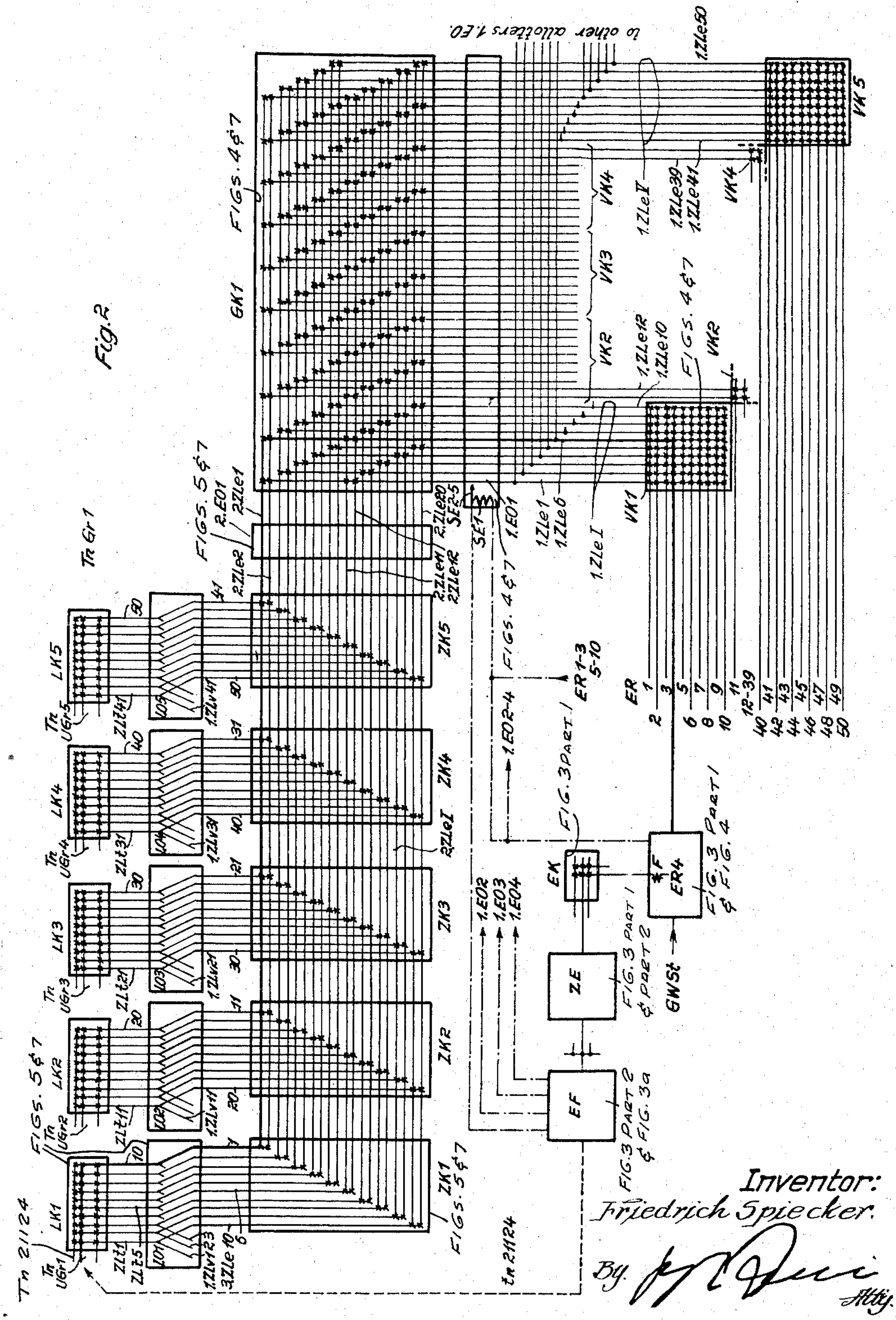
Fig. 2 illustrates the grouping scheme for the final selection stage of the group T*n*G*r*1 belonging to the principal group shown in Fig. 1.

*Description of Fig. 2*

This figure shows the various connecting paths in the line group TnGr1. Of the relay sets there is shown only one (ER4) which is represented by a rectangle. The figure also shows the precouplers VK1 and VK5 which are respectively associated with the relay sets ER1–10 and ER41–50 indicated in Fig. 1. Of the precouplers VK2 and VK4 there are shown only a few coupling points.

The relay set ER4 has access to the intermediate lines 1.ZLe1–10 (the group 1.ZLeI) over the pre-coupler VK1. Each of these intermediate lines can for connections with subscribers of the group TnGr1 be coupled with 4 of the group 2.ZLeI of group intermediate lines over the group coupler GK1. The group 2.ZLeI contains the intermediate lines 2.ZLe1–20. For example, the intermediate lines 1.ZLe1 and 1.ZLe6 can be connected together with the group intermediate lines 2.ZLe1, 2, 11 and 12, and the intermediate lines 1.ZLe2 and 7 can be interconnected with the group intermediate lines 2.ZLe3, 4, 13, 14. If a connection is to be made to the subscriber's line Tn 21124 (see dotted line at left of Fig. 2) which belongs to the subgroup TnUGr1, it will extend over the intermediate coupler ZK1. In this coupler can be reached the group intermediate lines 2.ZLe1 and 2, from the intermediate line 3.ZLe1=ZLt10 and the group intermediate lines 2.ZLe11 and 12 from the intermediate line 3.ZLe6=ZLt5. The path to be used for the connection is determined by relays in the allotters LO1, 1.EO1 and 2.EO1 which prepare and complete the respective busying and testing circuits.

Of the two intermediate lines 1.ZLe1 and 6 which may be coupled with the same group intermediate lines, one, for example, 1.ZLe1 will always be preferentially seized. Only if this line is busy will the other intermediate line 1.ZLe6 be made available. This sequence of seizure is controlled by busying relays which are arranged ahead of the branching of the intermediate lines to the different allotters 1.EO.

Once a calling subscriber is connected with the relay set ER4, over the group selection stage GWSt, there will be connected to it (ER4) over the coupler EK an idle register ZE. After receipt of the series of dial pulses by the digit relays in ZE, the line of the called subscriber Tn 21124 is marked in the marker EF which is connected to the main group. If the line is idle, it will be marked for coupling and a call marking will be produced in the allotter LO1. The marker EF determines at the same time those branches of the intermediate lines 1.ZLe over which extend the connections to the group of the selected subscriber's line. In the case of the assumed call to the subscriber's line 21124 these branches are those which are in the group coupler GK1 connectable with the group intermediate lines 2.ZLe1–20. In the allotter 1.EO1 which lies ahead of the group coupler GK1, a busy-prepare relay E1 is energized over a path (indicated in dot-dash lines) which by-passes the coupler VK1. This relay marks in the allotter 2.EO1, in a circuit which by-passes the coupler GK1, those group intermediate lines which happen to be idle but cannot be used due to busy condition of the first intermediate lines 1.ZLe which are accessible thereto. The third intermediate lines 3.ZL*e*=ZL*t* which have access to the non-available idle group intermediate lines are now disconnected by the allotter 2.EO1 along conductors which by-pass the intermediate coupler ZK1. Accordingly, a subscriber's intermediate line ZL*t* and its branch 3.ZL*e* for incoming calls, having access to group intermediate lines 2.ZL*e* which in turn have no access to an idle intermediate line 1.ZL*e*, will not be made available. If the intermediate lines 1.ZL*e*1 and 6 are busy, the subscribers' intermediate lines ZL*t*10=3.ZL*e*1 and ZL*t*5=3.ZL*e*6 must not be made available since these two intermediate lines are over the group intermediate lines 2.ZL1, 2, 11 and 12 connectable only with the busy intermediate lines 1.ZL*e*1 and 6.

It may be mentioned in concluding the description of Fig. 2 that the talking path is indicated by prominent lines. It extends to the subscriber's line 21124 from the relay set ER4 over the pre-coupler VK1, the intermediate line 1.ZL*e*6, the group intermediate line 2.ZL*e*1, the intermediate line 3.ZL*e*1 and the intermediate line ZL*t*10. The manner in which the various operations are performed will now be described with reference to Figs. 3 to 5.

*Description of Figs. 3–5*

Upon seizure of relay set ER4 (Fig. 3, part 1) by a calling subscriber, there will be energized, in the last coupler of the group selection stage NK the coupling relay K*g* which closes over its contact 1*kg* the holding circuit by way of the seizure relay C*e*4. An idle register ZE will be connected over the coupler EK.

The relay C*e*4 closes a circuit for the relay T, namely, circuit

1. From ground, contacts **306*ce*4, 307*p*, 308*n*, 309*g*, relay T, resistor 310, resistor 311**, to battery.

Resistor 310 is shunted at contact **312*t*. The relay T in any other relay set ER cannot energize upon closure of a contact, in such a set, corresponding to contact 306*ce*4, until contact 309*g* opens. The closure of contact 313*t*** connects ground potential to all coupling relays associated with the relay set ER4 in the coupler EK. Only the coupling relay will actuate for which a circuit has been prepared over a contact chain in the available register. Assuming this to be the coupling relay K*z*, there will result a circuit 2. From ground, contacts **306*ce*4, 307*p*, 308*n*, 313*t***, winding I of relay K*z*, winding I of relay C*z*, contact **314*ot*** to battery.

At contact **315*cz*** there will be closed a circuit

3. From ground, contacts **306*ce*4, 307*p*, 308*n*, relay G, relay N, contact 316*kz***, winding II of relay K*z*, resistor 3, winding II of relay C*z*, contact **315*cz***, relay O1, to battery.

Only the relays G and O1 energize in this circuit. The relays K*z* and C*z* are maintained energized. The relay N does not receive sufficient current to operate. The relay O1 opens its contact **314*o*1 and closes its contact 317*o*1 thus preparing for the seizure of the next idle register (not shown). Such seizure takes place upon closure of a circuit, in the other relay set, corresponding to the circuit "2." The circuit "1" is interrupted at contact 309*g* and relay T deenergizes. The next idle register can now be seized by another relay set. Contact 308*n* is shunted at contact 387*g*. Upon closure of contact 327*kz* a circuit will be closed for relay J, namely, circuit 4. From ground, contacts 328*a*4, 329*u* of a control relay (not shown), contacts 327*kz*, 330*g***, winding of relay J to battery.

Relay J upon energizing opens its contacts **331*i*, 333*i*, 335*i* and closes its contacts 332*i*, 334*i* and 336*i*. The first received impulses control the hundreds relays H1–H5. The closure of contact 332*i* has no effect so far as the relay H1 is concerned because the ground potential required for the successive energization and deenergization of the relays H1–H5 has not yet been connected to the conductor 326 over the contact chain 321*cz*, 322*t*1, 323*v*1, 324*s*1, 325*r*1**.

The hundreds relays H1–H5, the tens relays Z1–Z5 and the units relays E1–E5 are affected similarly by the transmitted current impulses. Accordingly, only the control of the hundreds relays by an impulse series comprising ten (10) impulses will be considered in the following discussion. The circuit conditon of the relays, upon receipt of each impulse, will determine the energization of the tens and units relays upon receipt of the same number of impulses.

The hundreds relays H1–H5 are affected as follows: The relay A4 which is connected to the upper line conductor responds to each impulse which is transmitted from a preceding repeater (not shown) disposed in the connection. Relay A4 energizes in response to the first impulse. The control relay V is energized in the circuit 5. From ground, contacts **301*ce*4, 302*p*, 303*a*4**, windings I and II of relay V.

The winding I is shunted at contact **304*v*, thus making the relay slow-to-release, and holding it during the receipt of an impulse series. Relay V1 in the register ZE is now energized in the circuit 6. From battery, resistor 318, contacts 305*v*, 319*n*, 18*kz*, 320*q***, winding of V1, to ground.

Relay V1 closes its contact **323*v*1. Ground potential is now connected to the conductor 326**.

The opening of contact **328*a*4 upon energization of relay A4 causes deenergization of the relay J (see circuit "4") which restores its contacts to the position shown. The relay H1 cannot energize upon closure of contact 323*v*1 because its winding is not connected with the conductor 326. Upon deenergization of the relay A4, at the cessation of the first impulse, the circuit "4" is closed again and relay J will again energize. A circuit is now closed for the relay H1, namely 7. From ground on conductor 326, contacts 332*i*, 338*h*2**, winding of relay H1 to battery.

Contact **339*h*1 is opened upon energization of relay H1 and contact 337*h*1 is closed. The winding I of the relay H2 is now switched in, but such winding is for the time being shunted over the contacts 337*h*1 and 332*i***.

The relay H1 is energized upon receipt of the first impulse denoting the selection of the digit "1" and provided that no further impulse is received. The contact **331*i* is closed upon receipt of the second digit and relay H2 energizes in a circuit 8. From ground at the conductor 326, contact 337*h*1, winding I of relay H2, 331*i* in parallel with 338*h*2**, winding of relay H1 to battery.

In this circuit "8," the winding II of the relay H2 is connected parallel to relay H1 by the opening of the contact **338*h*2 and closing of contact 352*h*2**.

Upon conclusion of the second impulse, the relay H1 is disconnected at contact **331*i* and deenergizes. The relay H3 energizes in the circuit 9. From ground on conductor 326, contacts 340*h*1, 341*h*2, winding I of relay H3, contact 342*h*4, resistor 343** to battery.

The relay H3 actuates its contacts, opening contact **344*h*3 and completes at contact 345*h*3 a holding circuit over its winding II and resistor 346. Upon opening of the contact 337*h*1, in the above traced circuit "8" there will result a holding circuit for the relay H2, namely, 10. From ground on conductor 326, contacts 332*i*, 352*h*2**, winding II of relay H2 to battery.

Relays H2 and H3 are now energized.

Contact **332*i* is opened responsive to receipt of the third impulse, and the holding circuit "10" extending over the winding II of the relay H2 is thereby interrupted. The relay H2 deenergizes and opens the circuit "9." The relay H3 remains energized over its winding II. Upon conclusion of the third impulse and consequent closure of contact 332*i***, relay H1 will again energize in the circuit "7."

After receipt of the third impulse, relays H1 and H3 will be energized.

Relay H2 is energized over the circuit "8" upon receipt of the fourth impulse. Relay H1 remains actuated over its holding circuit. The relay H4 now energizes in the circuit 11. From ground on conductor 326, contacts **347*h*1, 348*h*2, winding I of relay H4, contact 345*h*3, resistor 346** to battery.

Upon actuating, relay H4 closes at its contact **349*h*4 a holding circuit over its winding II and resistor 343. Relay H1 deenergizes upon conclusion of the fourth impulse because both contacts 331*i* and 338*h*2** are open at that instant.

At the conclusion of the fourth impulse the relays H2, H3 and H4 will therefore be actuated.

Contact **331*i* opens upon receipt of the fifth impulse and relay H2 accordingly deenergizes because its holding circuit "10" is interrupted. Upon conclusion of this impulse, relay H1 energizes over the circuit "7." The relay H3 is now caused to deenergize by current flow over its opposing winding III, in the circuit 12. From ground on conductor 326, contacts 347*h*1, 350*h*2, 351*h*4, opposing winding III of relay H3, contacts 345*h*3, resistor 346** to battery.

After receipt of the fifth impulse, relays H1 and H4 are accordingly energized.

Relay H2 is actuated in the circuit "8," upon receipt of the sixth impulse. Upon conclusion of this impulse and consequent opening of the contact **331*i*, the relay H1 will deenergize. The relay H5 is now actuated in the circuit 13. From ground on conductor 326, contacts 339*hi*, 353*h*4, winding I or relay H5, contact 344*h*3, resistor 346** to battery.

Relay H5 closes its contact **354*h*5** thereby completing a holding circuit over its winding II. The relay remains actuated during the receipt of the further impulses.

The relays H2, H4, and H5 are accordingly energized upon receipt of the seventh dial impulse when contact **332*i* is opened, thereby opening the holding circuit "10" for the relay H2 and causing restoration of such relay. Relay H4 is now deenergized by current flow over its opposing winding III in the circuit 14. From ground on conductor 326, contacts 340*h*1, 355*h*2, 356*h*3, opposing winding III of relay H4, contact 349*h*4, resistor 343** to battery.

At the conclusion of the seventh impulse and consequent closure of contact **332*i***, the relay H1 energizes in the circuit "7" while relay H5 is still actuated.

Relay J deenergizes upon receipt of the next following (8th) impulse, completing over contact **331*i*** the energizing circuit "8" for relay H2 over its winding I. Relay H restores upon actuation of relay J and the relay H3 energizes over the circuit "9."

After receipt of the 8th impulse, relays H2, H3 and H5 will accordingly be energized.

Upon receipt of the 9th impulse, relay H2 restores again and relay H1 is energized over the circuit "7" at the conclusion of this impulse.

Relays H1, H3 and H5 are now energized.

Upon receipt of the 10th impulse, relay H2 will be actuated over the circuit "8." Relay H4 thereafter energizes over the circuit "11" and continues to hold over its winding II. Relay H1 restores upon actuation of the relay J and consequent opening of contact **331*i***.

Relays H2, H3, H4 and H5 will be in actuated position at the conclusion of the 10th impulse, that is, at the conclusion of the impulse series denoting the digit "0."

The following table indicates the relays H1 . . . H5 that are energized incident to the impulses 1–0. The relays Z1–Z5 and E1–E5 are controlled in identical manner and these relays have therefore been included in the table in parentheses.

| Impulses Received | Relays | | | | |
|---|---|---|---|---|---|
| | H1 (Z1) (E1) | H2 (Z2) (E2) | H3 (Z3) (E3) | H4 (Z4) (E4) | H5 (Z5) (E5) |
| 1 | x | | | | |
| 2 | | x | x | | |
| 3 | | | x | | |
| 4 | | x | x | x | |
| 5 | x | | | x | |
| 6 | | x | | x | x |
| 7 | x | | | | x |
| 8 | | x | x | | |
| 9 | x | | x | | x |
| 10 | | x | x | x | x |

Further impulses are not received and contact **303*a*4 remains open. The control relay V consequently deenergizes and restores its contacts thereby also opening its contact 305*v*. The circuit "6" is interrupted at the contact 305*v*. Relay V1 in the register restores and opens its contact 323*v*1. The shunt for relay R over the contacts 321*cz*–325*r* is now removed and relay R energizes over contact 399*h*1 or 361*h*2, depending on whether an even or an odd number of impulses had been received, in the circuit 15. From ground, contacts 360*cz*, 399*h*1 or 361*h*2, wind- of relay R, conductor 326** and thence over the holding windings of the relays H that had been energized in accordance with the number of the received impulses, to battery.

Only one hundreds impulse had been received in the assumed case of a connection to the line 21124, and the circuit "15" therefore extends over the winding of relay H1 (**332*i*, 338*h*2**, H1).

Contact **325*r* is opened responsive to the actuation of the relay R and contact 362*r* is coincidently closed. The connection of ground or plus potential to the conductor 364, for affecting the tens relays Z1–Z5 upon receipt of the tens impulse series, is prepared by the closure of contact 362*r***.

Only one impulse has been received, and at the end of such impulse, only relay H is energized. Accordingly, as shown in Fig. 3, part 2, the hundreds conductor H*a*1 is now marked over the contacts **363*h*4, 4*h*1, 365*h*5, 366*h*3**. A circuit for the relay H11 in the marker EF, which will be closed later, is now prepared. Relay H11 is the first hundreds relay in the 21st thousands group.

In accordance with the tens digit 2 of the line to be selected, the impulse series which is to affect the tens relays Z1–Z5 of the register, comprises two impulses. Upon receipt of these impulses, the relays Z2 and Z3 will be energized. The relay S1 is actuated in the circuit 16. From ground, contacts **367*cz*, 368*z*2, relay S1, conductor 364** and thence over the windings of the energized relays Z2 and Z3 to battery.

Contact **324*s*1 is opened upon actuation of relay S1 and contact 369*s*1 is closed. This prepares the connection of the plus potential to the conductor 370** to which are connected the units relays. The connection of the plus potential takes place upon actuation of relay V1 responsive to receipt, in the relay set, of the first unit impulse.

The tens conductor *za*2 is now marked over the contacts 5*z*3, 6*z*2, 373*z*4 and 374*z*5 of the circuit formed by the contacts of the relays Z1–Z5, because only the relays Z2 and Z3 are in actuated position. Over this tens conductor *za*2 will be subsequently energized, in the marker, the tens relay Z12 of the first hundreds of the 21st thousand.

Upon receipt of the unit impulse series comprising four impulses corresponding to the unit digit 4 of the desired line, there will be energized the units relays E2, E3 and E4. The units conductor *ca*4 is marked over the contacts 7*e*3, 8*e*2, 9*e*4 and 10*e*5. As will be presently described, the connection of the desired line 21124 is controlled over the units conductor *ea*4.

When the relay V1 restores responsive to the receipt of the units impulses, it removes the shunt of the relay T1 by opening its contact 332*v*1 and relay T1 energizes in the circuit 17. From ground, contacts 380*cz*, 381*e*2, relay T1, conductor 370, and thence over the windings of the energized relays E2, E3, E4 to battery.

The energization of the relay T1 is a criterion for the receipt, in the register, of the dial digit series required for completing a desired connection. Relay T1 opens its contact 381*t*1 and closes its contact 382*t*1. The relay P*z*1 now energizes, provided no signal is present at this instant, from another register, by the closure of an associated contact corresponding to the contact 382*t*1 to signify the completion of a connection which would cause the test relay of such other register, for example, relay P*z*2 of the register ZE2, to operate thereby opening the contact 383*pz*2. The relay P*z*1 energizes in the circuit 18. From ground, resistor 388, contacts 385*sp*, 386*pzn*, 383*pz*2, 387*pz*1, 382*t*1, relay P*z*1, relay S*p* to battery.

Relay S*p* energizes upon shunting of the resistor 388 at contact 389 *pz*1 and opens its contact 385*sp*. In the relay set ER4, the relay N will be actuated because the resistor 3 disposed in the circuit "3" will be shunted at contact 11*pz*1. Contact 319*n* is opened responsive to the actuation of relay N and contact 12*n* is closed. The relay H11 in the marker EF will now be connected over the circuit formed by the contacts of the hundreds relays H1–H5 (Fig. 3, part 2) such circuit being 19. From ground, contact 390*cz*, relay Q, contacts 13*pz*1, 363*h*4, 4*h*1, 365*h*5, 366*h*3, conductor *ha*1, relay H11, resistor 16 to battery.

The energization of the relay H11 serves as a criterion that a connection is to be completed in the 1st hundred of the 21st thousand group. The relay H11 closes its contacts and thereby connects all of the ten tens relays Z11, Z12 . . . Z10. Only the tens relays Z11, Z12 and Z13 are shown. The tens digit "2" having been dialed, the tens relay Z12 will energize in the circuit 20. From ground, contacts 392*cz*, 14*pz*1, 5*z*3, 6*z*2, 373*z*4, 374*z*5, conductor *za*2, contact 17*h*11, relay Z12, resistor 16 to battery.

The relay Z12 closes its contacts *z*12, each of these contacts connecting one units conductor *ea* with the corresponding subscriber line of the 2nd tens group. The number 21124 having been dialed, the circuit is now prepared at contact 20*z*12 over which a subscriber line is controlled.

The relay Q which operates in the circuit "19" opens its contact 320*q* and closes its contact 394*q*. There is now closed the testing circuit 21. From ground, relay F, contacts 12*n*, 18kz, 394*q*, conductor 395, contacts 15*pz*1, 7*e*3, 8*e*2, 9*e*4, 10*e*5, conductor *ea*4, contact 20*z*12, conductor *tn*21 124, to Fig. 5, contact 21*ar*1, relay K*a*1 winding II, contact 22*tr*1, winding I of relay K*a*1, conductor 23, relay A*n*1 to battery.

The relays F, K*a*1 and A*n*1 energize. Relay A*n*1, at its contact 26*an*1 disconnects ground from relay R1 which is energized only in calls outgoing from a subscriber's line. No coupling marker signal can now be produced on any of the subscribers' lines in the group until interruption of the circuit traced at "21" and consequent de-energization of relay A*n*1. At contacts 27*ka*1, relay K*a*1 short-circuits its winding II. The signal marking the coupling is produced by the contact 28*ka*1 (of relay K*a*1) which connects ground to the energizing windings of all the coupling relays such as $Kt_1 5$, $Kt_1 10$ which can switch connections through to the subscriber's line 21124. At contact 29*ka*1 is prepared the holding circuit which will be closed after switching through the talking path from the relay set ER4 to the subscriber's line T*n* 21124.

The relay A*n*1 initiates the selection of an idle intermediate subscriber line ZL*t*. These intermediate lines are in incoming calls taken into use in the sequence 10, 9, 8, etc. instead of in the sequence 1, 2, 3, etc., as in the case of outgoing calls. The circuit of the relay Q*e* which initiates the coupling of the intermediate subscriber line to be used with the selected subscriber's line extends over the contact 30*an*1. Before the coupling can be initiated, it is necessary to ascertain whether the idle intermediate subscriber line ZL*t*10 and its branch 3.ZL*e*1 have access to the relay set ER4 (connected with the calling line), over an idle intermediate group line 2.ZL*e* and an idle first intermediate line 1.ZL*e*. The test for ascertaining this condition is initiated by the closure of contact 31*an*1.

The test relay F in the relay set ER4 has closed the contact 32*f* (left lower end of Fig. 4), thereby connecting battery to the conductor 33 leading to the winding of the coupling initiation relay Q*r*4 and also to the relays $SE1^1$–$SE2^1$ . . . etc. in the allotters 1.EO1–4. The relay SE1 in the allotter 1.EO1, which is associated with the group in which the connection is to be made, energizes and an idle intermediate subscriber line ZL*t* (in the line coupler of the subgroup of the selected subscriber's line) which cannot be connected with the marked relay set due to lockout from second or first intermediate lines (2.ZL*e*, 1.ZL*e*), consequently cannot be made available for the call. This is done by marking the locked out first intermediate line 1.ZL*e* of the first stage. Since a connection is to be made in the subscriber group T*n*G*r*1 (numbers 21100–21350), the circuit for the busy or lockout relay $SE1^1$ in the allotter 1.EO1 is closed. Each group of subscribers' lines comprises 250 lines. The first line group is marked when one of the tens relays (Z10—Z35) having the contacts *z*10—*z*35 has energized. In the present case, the tens relay Z12 is energized, the corresponding contact 34*z*12 (right lower end of Fig. 3, part 2) is operated and a circuit is completed for the relay $SE1^1$ as follows:

22. From ground, contact 34*z*12, conductor 35, winding of relay $SE1^1$, coupling-initiation relay Q*r*4, conductor 33, closed contact 32*f* to battery.

The relay Q*r*4 closes its contacts *qr*4, thereby connecting the winding I of the test relay P (Fig. 3, part 1) with all coupling relays K1–K10 of the relay set ER4 in the pre-coupler VK1. Just which of the coupling relays will energize will depend on the first, second and third intermediate lines 1.ZL*e*, 2.ZL*e* and 3.ZL3 (ZL*t*) which are to be used for the call.

As is apparent from Fig. 2, the intermediate line 1.ZL*e*1 as well as the intermediate line 1.ZL*e*6 in the final group coupler GK1 have access to the intermediate group lines 2.ZL*e*1, 2, 11 and 12, and also (see Fig. 1) over the group couplers GK2–4 access to the corresponding intermediate group lines 2.ZLe21, 22, 31, 32, 41, 42, 51, 52, 61, 62 and 71, 72 which are associated with the subscriber's groups TnGr2–4.

The intermediate group lines 2.ZLe1 and 2 may be coupled with the intermediate lines 3.ZLe1 (in the coupler ZK1); 3.ZLe11 (in the coupler ZK2) etc., while the intermediate group lines 2.ZLe11 and 12 may be connected with the intermediate lines 3.ZLe6 (in the coupler ZK1); 3.ZLe16 (in the coupler ZK2) etc. It follows therefore that the idle intermediate subscriber line ZLt10 (=3.ZLe1) can be made available for a connection only if one of the intermediate group lines 2.ZLe1 and 2 and one of the intermediate lines 1.ZLe1 or 6 of the first group 1.ZLe1 (Fig. 1) are idle. The intermediate subscriber line ZLt5 (=3.ZLe6) may however be also coupled with the first intermediate lines 1.ZLe1 and 6.

Only some of the many possible busy or lockout conditions will now be explained.

It shall be first assumed that the intermediate subscriber lines ZLt10=3.ZLe1 and ZLt5=3.ZLe6 are idle, and that the intermediate group lines 2.ZLe1 and 6 are busy due to connections which extend over the couplers ZK2–5 of the subgroups TnUGr2–5. The relays $C5^1$ and $C5^2$ which are disposed in the allotter 2.EO1 (Fig. 5), with their windings I in the holding conductor are in such a case energized. The contacts $36c5^1$, $37c5^2$ are closed so that the relay CO10 in the allotter LO1 will energize upon closure of the contact 31an1 in a circuit 23. From battery, contacts 31an1, 38r1, winding II of relay CO10, contacts $36c5^1$, $37c5^2$ to ground.

Relay CO10 opens its contact 39co10. The coupling-initiation relay Qe10 cannot energize. The chain serving for making available an idle intermediate line switches further. In the corresponding circuits there will be energized the busy or lockout relays of those intermediate subscriber lines which (like the intermediate line ZLt10) have no access to an idle intermediate group line. For example, if the intermediate group line 2.ZLe11 and 2.ZLe12 are busy, the relays $C5^{11}$ and $C5^{12}$ will be operated. The contacts $41c5^{11}$ and $42c5^{12}$ are consequently closed and the lockout relay CO5 of the intermediate subscriber line ZLt5=3.ZLe6 will operate to disconnect the coupling-initiation relay Qe5 at its contacts 43co5 and to switch the chain through at contact 44co5.

Ground is also connected to the lockout conductors, leading to the other allotters LO2–5, by contacts of the relays $C5^1$, $C5^2$, $C5^{11}$, $C5^{12}$. Relays corresponding to the relays CO10 and CO5 in these allotters do not energize if the associated intermediate lines are idle, because the call receiving relays An are not energized in these allotters.

If the intermediate group lines 2.ZLe1 and 2 are idle, there is still no assurance that the talking path can be completed over the intermediate subscriber line ZLt10 because the first intermediate lines 1.ZLe1 and 6 of the first stage (which are accessible from the final selection relay set ER4 and with which the intermediate group line 2.ZLe1 and 2 may be coupled) might be busy by connections extending to subscribers of other groups.

Assuming the intermediate group lines 2.ZLe1 and 2 to be idle, there will be no current flowing through the windings I of the lockout relays $C5^1$, $C5^2$ in the allotters 2.EO1. Second windings of these relays are however connected to the lockout conductor 401. A potential is connected in the allotter 1.EO1 to this lockout conductor and also to the lockout conductor 406 which belongs to the intermediate group lines 2.ZLe11–12 (also accessible to the intermediate lines 1.ZLe1 and 6), because the lockout relay $SE1^1$ is energized in the circuit "22" traced before, and because the lockout relays C1 and C6 are connected in the holding conductors of the busy intermediate lines 1.ZLe1 and 6. The relays $C5^1$ and $C5^2$ therefore energize responsive to the energization of the lockout-initiation relay $SE1^1$ in the circuit 24. From ground, contacts 45c6, 46c1, $47se1^1$, conductor 401, relay $C5^2$ (winding II), relay $C5^1$ (winding II) to battery.

Another circuit is completed for the relays $C5^{12}$ and $C5^{11}$

25. From ground, contacts 48c6, 49c1, $50se1^1$, conductor 406, winding II of relay $C5^{12}$, winding II of relay $C5^{11}$ to battery.

Circuits over windings II of relays in the allotters 2.EO2–4 corresponding to the relays $C5^1$, $C5^2$, $C5^{11}$ and $C5^{12}$ are not completed because the lockout-initiation relays $SE1^{2-4}$ in the allotters $1.EO^{2-4}$ are not energized. For example, the lockout-initiation relay $SE1^2$ in the allotter 1.EO2 is energized only after selection of a subscriber's line in the group TnGr2.

As explained before, the lockout relays in the allotters LO2–5 of the other subscribers' groups TnUGr2–5, corresponding to the relays CO10 and CO5 in the allotter LO1 are not operated.

If the intermediate lines 1.ZLe1 and 6 are busy and if a connection is to be set up from a group having a relay set which is not associated with the pre-coupler VK1, for example, from the relay set ER24, the closed contacts 45c6, 46c1 and 48c6, 49c1 will not affect the lockout relays $C5^1$, $C5^2$ and $C5^{11}$, $C5^{12}$, because the lockout-initiation relay $SE1^1$ is not energized in such a case, but the relay $SE3^1$ associated with the third group of relay sets is energized. The lockout relays $C5^1$ and $C5^2$ (winding II) can energize in a circuit over the conductor 401 and contact $51se3^1$ only if the relays C26 and C21 of the intermediate lines 1.ZLe21 and 26 are energized and their contacts 52c21 and 53c26 closed. The relays $C5^{11}$ and $C5^{12}$ (windings II) will in such a case also energize over corresponding contacts and the conductor 406.

No matter from which final selection relay set the signal for setting up a call is given, the making available of idle second and third intermediate trunks is always inhibited if the involved relay set cannot be reached from such lines due to lockout of the first intermediate lines. If both first intermediate lines 1.ZLe1 and 6 and also both intermediate group lines 2.ZLe1 and 2 are idle, the connection will be set up over the intermediate lines 1.ZLe1 and 2.ZLe1 because the coupling conductor is in such lines switched through over the resting contacts of the associated lockout relays C1 and $C5^1$.

If the intermediate line 1.ZLe1 is busy, the lockout relay C1 will be energized. The contact 54c1 of this relay is opened. A coupling circuit cannot be established over the corresponding conductor, but can be established over the coupling conductor of the intermediate line 1.ZLe6 which has been switched through at contact 55c1.

If the intermediate line 2.ZLe1 is busy, its lockout relay $C5^1$ will be energized. The contact $56c5^1$ in the associated coupling conductor will be open. The contact $57c5^1$ in the coupling conductor of the intermediate line 2.ZLe2 is closed. The connection will be set up over the intermediate line 2.ZLe2.

It will be apparent from the foregoing explanations that the following operations occur:

Criteria are given step by step, from one to the other intermediate line stage, to indicate which of the first intermediate line pairs (1.ZLe1—6) are busy or locked out, so as to prevent making available an idle third intermediate line pair which can be coupled only with the locked out pair of intermediate lines 1.ZLe.

The sequence in which the intermediate lines of a pair (1.ZLe1, 6—2.ZLe1, 2 or 11, 12) are taken into use is determined by the busy or lockout relay (C1, $C5^1$, $C5^{11}$) of the line of the pair which is to be used first.

When the signal for the setting up of a connection to the subscriber 21124 becomes effective, that is, when the relays An1 and $SE1^1$ in the allotter LO1 and in the allotter 1.EO1, respectively, energize, thus indicating that the intermediate lines ZL*t*10=3.ZL*e*1, 1.ZL*e*6 and 2.ZL*e*1 are idle. The intermediate lines 1.ZL*e*1 and 2.ZL*e*2 are busy. The contacts 56*c*5$^1$ in the allotter 2.EO1, Fig. 5, and 55*c*1 in the allotter 1.EO1, Fig. 4, are closed.

Since the relay CO10 in the previously traced circuit "23" is not energized, the coupling-initiation relay Q*e*10 for incoming calls, and also relay Q*h*, will energize in the allotter LO1 in a circuit.

26. From ground contacts 30*an*1, 58*qh*, 59*r*1, 39*co*10, winding of relay Q*e*10, winding of relay Q*h* to battery.

A holding circuit will now be completed for both of these relays

27. From ground, contacts 60*an*1, 62*qe*10, winding of relay Q*e*10, winding of relay Q*h* to battery.

The above traced circuit "26" is opened at contact 59*qh* and relay CO10 energizes in a circuit 28. From ground, contact 63*qe*10, winding II of relay CO10, contacts 38*r*1, 31*an*1 to battery.

Relay CO10 opens its contact 39*co*10 and at contact 40*co*10 switches through the starting chain for incoming calls to the coupling-initiation relay for the next idle intermediate line. However, this relay cannot energize because contact 58*qh* is open. Relay Q10 now energizes in a circuit 29. From ground, contact 64*qe*10, winding of relay Q10 to battery.

The relay Q10, upon energizing places at its contact 66*q*10 a potential on that coupling relay of the subscriber's line 21124 which can connect such line with the intermediate subscriber line ZL*t*10 having the branch 3.ZL*e*1 for incoming calls which is to be used for the connection to be set up. In the assumed case, the subscriber coupling relay K*t*1$^{10}$ will energize in a circuit 30. From ground, contact 28*ka*1, winding I of relay K*t*1$^{10}$, conductor 67, contact 66*q*10 to battery.

The coupling of the subscriber's line T*n* 21124 with the intermediate line ZL*t*10 is effected by contacts 68*kt*1$^{10}$, 69*kt*1$^{10}$ and 70*kt*1$^{10}$.

The branch 3.ZL*e*1 of the line ZL*t*10 which is to be used for incoming calls is coincidently coupled with the intermediate line 1.ZL*e*6 in a circuit 31. From ground (Fig. 5), contact 65*qe*10, winding I of coupling relay K*z*1$^1$, contact 56*c*5$^1$, conductor 71 to Fig. 4, winding I of coupling relay K*g*6$^1$, contact 55*c*1, winding I of coupling relay K6, contact 72*qr*4, conductor 73 to Fig. 3 part 1, winding I of relay P to battery.

The following coupling operations are effected:

The intermediate lines 3.ZL*e*1/2.ZL*e*1 are coupled at contacts 74–76*kz*1$^1$; the intermediate lines 2.ZL*e*1/1.ZL*e*6 are coupled at contacts 77–79*kg*6$^1$; and the intermediate line 1.ZL*e*6 is coupled with the final selection relay set ER4 at contacts 80–82*k*6.

There is now established a holding circuit

32. From ground at Fig. 5, contact 29*ka*1, winding II of the line relay AR1, winding I of the cut-off relay TR1, contact 70*kt*1$^{10}$, winding II of the coupling relay K*t*1$^{10}$, conductor 83, winding III of the busy or lockout relay CO10, conductor 84, contact 76*kz*1$^1$, winding II of the coupling relay K*z*1$^1$, winding I of the lockout relay C5$^1$, conductor 85 to Fig. 4, winding II of the coupling relay K*g*6$^1$, contact 79*kg*6$^1$, lockout relay C6, contact 82*k*6, winding II of the coupling relay K6, conductor 86 to Fig. 3 part 1, winding II of relay P, contacts 87*p*, 88*x*, 89*f*, resistor 90 to battery.

The cut-off relay TR1 disconnects the call bridge and therewith the winding I of the line relay AR1 at its contacts 91*tr*1 and 92*tr*1. At its contact 22*tr*1 it opens the previously traced circuit "21." The relays A*n*1, K*a*1 (Fig. 5) and F (Fig. 3) deenergize. The contact 29*ka*1 opens thereby removing the shunt around the meter Z*a*1 of the called line, and thus connecting the meter in the circuit "32" noted above. The previously traced circuits "27" "28" and "29" are opened by the deenergization of relay A*n*1 in the allotter LO1. The previously traced circuit "3" in the relay set is interrupted (at contact 30*fp*) as a consequence of the energization of the relay P in the previously traced circuit "31." The path for the setting up of the call is now freed. The shunt of the relay S in the relay set ER4 (Fig. 3 part 1) is removed at contact 89*f* responsive to the deenergization of relay F. Relay S energizes and effects switching operations which have no particular bearing on the invention, such as switching through the line conductors to the selected subscriber.

The connection between the relay set ER4 and the called subscriber 21124 is now completed. The connection may be traced from the switching device ER4 (Fig. 3, part 1) which had been assumed to have been seized by a group selection device GWS*t* (Fig. 2), conductors at the top of Fig. 3, part 1, over to Fig. 4, and from there, following the prominently drawn line conductors, over closed contacts 80*k*6—81*k*6, 77*kg*6$^1$—78*kg*6$^1$, to Fig. 5, thence over contacts 74*kz*2′—75*kz*1′, 68*kt*1—69*kt*$^{10}$, the line conductors terminating in the station of the called line T*n* 211 24 as shown. The functions of the line and cutoff relays AR1 and TR1 of the called line have been explained before.

The lockout-initiating relays SE in the allotters 1.EO are energized only for the brief interval required for completing a call. The current consumption required for the busying or lockout of the intermediate lines which, although, idle, cannot be used for a connection to be set up due to lockout of intermediate lines of other stages, therefore amounts only to a fraction of what would be necessary without these lockout-initiating relays. These relays also simplify the circuits needed for carrying out the lockout.

For example, when a signal is received in the allotter LO1 of the group T*n*G*r*1 for the setting up of an incoming call, there must be marked in such allotter just which of the idle third intermediate lines (3.ZL*e*/ZL*t*) are to be disconnected if the first intermediate lines (1.ZL*e*), which are available to these idle lines, are busy or on lockout due to connections existing in other line groups.

Inasmuch as the conditions in all parts of first intermediate lines are identical, the following explanations will refer only to the intermediate lines 1.ZL*e*1 and 6 which are accessible to the relay sets ER4.

If the lockout-initiation relays SE1$^{1-4}$ were not provided, all line groups in the allotters 2.EO1–4 would have to be marked always at times when the two intermediate lines 1.ZL*e*1 and 6 are on lockout. With these first intermediate lines may be coupled in each line group two pairs, that is, eight pairs of intermediate group lines 2.ZL*e*. These are:

(*a*) In coupler GK1 intermediate lines 2.ZL*e*1, 2; 11, 12.
(*b*) In coupler GK2 intermediate lines 2.ZL*e*21, 22; 31, 32.
(*c*) In coupler GK3 intermediate lines 2.ZL*e*41, 42; 51, 52.
(*d*) In coupler GK4 intermediate lines 2.ZL*e*61, 62; 71, 72.

Only two of these sixteen intermediate lines can be coupled together with the intermediate lines 1.ZL*e*1 and 6. In these lines, the lockout relays disposed in the lockout conductors, such as C5$^1$ (winding I) and C5$^2$ (winding I) are energized by current flowing in the holding circuit. However, the other fourteen intermediate group lines must also be marked as busy or locked out inasmuch as they may be idle but not useable. It must be considered that intermediate subscriber lines ZL*t* =third intermediate lines, 3.ZL*e*, must be made available which have access to these intermediate group lines. Lockout relays of these intermediate group lines therefore must always be operated so long as the intermediate lines 1.ZL*e*1 and 6 are on lockout.

Considering the 80 intermediate group lines of each principal group there will result a very noticeable current consumption. The current consumption will not be reduced in the case of a "negative" lockout, that is, a lockout in which the lockout relays are energized when lines are idle and at rest when the lines are busy. The current consumption will be indeed somewhat higher since the time during which more than half of the intermediate group lines are used is shorter than the time during which more than half of the intermediate group trunks are idle. The lockout relays $C5^1$, $C5^2$, $C5^{11}$ and $C5^{12}$ in the allotter 2.EO1 and the corresponding lockout relays in the allotters 2.EO2–4 therefore must always be energized incident to lockout of the intermediate lines 1.ZL*e*1 and 6, in spite of the fact that only two of these trunks belong to the intermediate group lines which are involved in calls extending over the intermediate lines 1.ZL*e*1 and 6.

The identical expenditure would be required in connection with the lockout relays of those intermediate group lines of all subscribers' groups which may be coupled with other busy intermediate line pairs, for example, 1.ZL*e*3 and 8, 4 and 9, etc. The use of the lockout-initiating relays SE makes it possible to limit the energization of lockout relays of idle but not useable group lines to the short intervals in which the connection of idle subscribers' lines occurs in the setting up of calls. The lockout relays are also effectively connected only in one of the allotters 2.EO. Since there is only one marker provided, only one selected subscriber's line of all the lines in each principal group can be connected at any instance and accordingly, one lockout-initiating relay can be coincidently energized.

As will be apparent from Fig. 2, the first intermediate lines 1.ZL*e*11, 16, 21, 26, 31, 36, 41, 46 which are not accessible to the calling relay set ER4 have access to the same intermediate group lines, 2.ZL*e*1, 2, 11, 12. Since an energized lockout-initiating relay SE$1^1$ indicates clearly from which group of the relay sets the signal comes, no marking is required to indicate the operating conditions with respect to the above noted first intermediate lines which cannot be reached from the signalling relay set ER4. However, if the lockout relays were not provided, it would always be necessary to consider the operating conditions of these first intermediate lines, thus resulting in complicated circuits.

The circuit for the lockout-initiating relay SE$1^1$ is completed responsive to closure of one of the contacts of the tens relays Z11–Z35, which are disposed in parallel. The parallel circuit for the 25 contacts may be avoided (in groups comprising 250 lines) by employing, as shown in Fig. 3*a*, an auxiliary relay HR1 for each group of 25 tens relays which mark a group of 250 subscribers' lines.

The relay HR1 energizes in series with the tens relay Z12. See previously traced circuit "20." At its contact *hr*1, it connects ground to the conductor 35 (Fig. 3*a*) thereby closing the circuit for the lockout-initiating relay SE$1^1$.

The lockout-initiating relays SE$1^1$, etc. need not be switched in from the marker EF. The switching in may be carried out from the allotters LO as indicated in Figs. 4 and 5 in dotted lines. The conductor 35 and the contacts of the tens relays in the marker lying parallel thereto may in such a case be omitted.

The relay R1 which marks the outgoing direction of a call to be set up is not energized when the call receiving or start relay A*n*1 energizes responsive to a signal signifying an incoming call. The lockout-initiating relay SE$1^1$ in the allotter 1.EO1 thereupon energizes in a circuit 33. From battery (Fig. 3, part 2), contact 32*f*, conductor 33 (Fig. 4), coupling initiating relay Q*r*4, lockout-initiating relay SE$1^1$, conductor 97 (lower right of Fig. 5), contacts 96*r*1, 95*an*1 to ground.

The relay SE$1^1$ initiates the switching operations already described.

The conductor 97 also leads to the corresponding *an*- and *r*-contacts in the allotters LO2–LO5 of the same subscriber group T*n*G*r*1. The relay SE$1^1$ is energized only when a connection to be set up in the subscriber group T*n*G*r*1, just as in the case of its actuation from the marker.

The control of the lockout-initiation relays from the allotters makes it possible to distribute the lines of a P. B. X group as desired, in several subgroups of a line group as well as in several line groups of a principal group of subscribers' lines.

The distribution of the lines of a P. B. X group in different line groups makes it possible to increase their number at any time, without requiring changes in the numbering of the P. B. X group or of other subscribers if free lines are not available in the group to which the P. B. X group belongs.

The distribution of the lines of a P. B. X group in several line groups may however be called for even without increase of the number thereof, if increased traffic requirements should cause operational difficulties. It may happen, for example, that the number of available intermediate subscriber lines cannot handle the traffic. An increase of the number of intermediate subscriber lines would call for an increase of the number of coupling relays, not only in the line coupler but also in the intermediate couplers. It is possible, by distributing the extension lines of a P. B. X group in several line groups to mix the heavily loaded P. B. X with subscribers' lines showing little traffic or with subscribers whose peak loads occur at times different from the peak loads of the P. B. X.

A P. B. X group having lines distributed in two line groups will now be described with reference to Fig. 7.

*Description of Fig. 7*

The talking or line paths are indicated in this figure by single conductors. They comprise, as those shown in Figs. 3–5, four conductors, that is, a coupling conductor, a holding conductor and two line conductors. Furthermore, the figure shows in each line group only one pair of intermediate group lines, namely, 2.ZL*e*1, 2 of the group T*n*G*r*1 and 2.ZL*e*41, 42 of group T*n*G*r*3, together with the windings of the lockout relays which are disposed in the special lockout conductors. However, as is apparent from Figs. 1, 2 and 4, the intermediate lines 2.ZL*e*11, 12, 51, 52 may also be coupled with the intermediate lines 1.ZL*e*1 and 6 in the two subscribers' groups.

The P. B. X group is assumed to have four P. B. X lines which are distributed in three subgroups belonging to two subscriber groups. The collective number of the P. B. X group is assumed to be 21131. The two lines 21131 and 21132 belong to the subscriber subgroup T*n*UG*r*1 and the line 21231 belongs to the subgroup T*n*UG*r*3. These three lines may be reached over the group T*n*G*r*1. The fourth line of the P. B. X group has the number 21531. It belongs to the subgroup T*n*UG*r*11 and therewith to the line group T*n*G*r*3.

The P. B. X group is reached over the control conductor or start conductor *ma*. If the line 21131 is idle, the test circuit "21" extends 34. From the conductor *ma*, contacts 101*tr*1, 102*ar*1, winding I of coupling signal relay K*a*1, conductor 23, winding of relay A*n*1 to battery.

The relay K*a*1 produces in usual manner the coupling signal. The relay A*n*1 closes its contact 95*an*1 causing the relay SE$1^1$ to energize and to prepare at its contact 47*se*$1^1$ the circuit for the lockout relays $C5^1$, $C5^2$ of the intermediate group lines 2.ZLe1 and 2. The two relays energize as already described, when the two first intermediate lines 1.ZLe1 and 6 are on lockout. By closing their contacts $36c5^1$ and $37c5^2$, they switch in the relay CO1o thereby preventing that the intermediate subscriber line ZLt10=3.ZLe1, although idle, is made available.

The relays $C5^{11}$, $C5^{12}$ (not shown) of the second pair of intermediate group lines which may be coupled with the intermediate lines 1.ZLe1 and 6 are also energized in a manner as explained before with reference to Figs. 4 and 5. They prevent making available the intermediate lines ZLt5=3.ZLe6.

If the line 21131 is busy, the start conductor *ma* will be switched to the coupling signal relay Ka2 of the second line 21132, by the closure of contact 103tr1. The start circuit then extends over the contacts 103tr1, 104tr2, 105ar2, etc. The coupling signal relay Ka2 and the start relay An1 energize and initiate the setting up of the call.

If the line 21132 is also busy, the start circuit will be switched to the third line 21231 of the P. B. X group. This line does not belong to the subgroup TnUGr1 but to the subgroup TnUGr3 which is associated with the line coupler LK3 and the allotter LO3. The impulse for setting up the call reaches the coupling signal relay Ka3 over a circuit 35. From ground on the start conductor *ma*, contacts 103tr1, 106tr2, 107tr3, 108ar3, winding I of relay Ka3, conductor 109, winding of relay An3 to battery.

The relay Ka3 produces the coupling start impulse. The start relay An3 closes the contacts which initiate making available an idle intermediate subscriber line and also the contacts 111an3 and 112an3. The lockout-initiating relay $SE1^1$ is now energized in a circuit 36. From battery, contact 32f (lower left of Fig. 7), conductor 33, coupling initiation relay Qr4, lockout-initiation relay $SE1^1$, conductors 97, 114, contacts 113r3, 112an3 to ground.

The relay $SE1^1$ causes upon energizing, the previously described switching operations.

If only the P. B. X line 21531 is idle upon receipt of the call impulse over the conductor *ma*, the testing will extend in a circuit 37. From ground on the conductor *ma*, contacts 103tr1, 106tr2, 115tr3, 116tr4, 117ar4, winding I of coupling start relay Ka4, conductor 118, winding of start relay An11 to battery.

The relay Ka4 produces the coupling start impulse. The relay An11 closes among others the contacts 120an11, 121an11. The lockout-initiation relay $SE1^3$ energizes in a circuit.

38. From battery, contact 32f, conductor 33, coupling initiation relay Qr4, conductor 124, lockout-initiation relay $SE1^3$, conductor 123, contacts 122r11, 121an11 to ground.

Assuming the intermediate lines 1.ZLe1 and 6 to be busy and, accordingly, the lockout relays C1 and C6 to be energized, the lockout relays C41 and C42 of the intermediate group lines 2.ZLe41 and 42 will operate in a circuit 39. From ground (left lower end of Fig. 7), contacts 45c6, 46c1, conductor 125, contact $126se1^3$, lockout relays C42, C41 to battery.

The lockout relay CO110 in the allotter LO11 will now energize in a circuit

40. From ground, contacts 127c42, 128c41, winding of relay CO110, contacts 129r11, 120an11 to battery.

The lockout relay CO110 prevents taking into use the subscriber intermediate line ZLt10 of the third subscriber group and switches the starting chain (see Fig. 5) to the next intermediate subscriber line.

If the intermediate lines 1.ZLe1 and 6 are on lockout there will be energized in addition to the relays C41 and C42 also the lockout relays C51 and C52 (not shown in Fig. 7) of the intermediate group lines 2.ZLe51 and 52 (also omitted in Fig. 7). They prevent making available a third intermediate line in the subgroup TnUGr11 which has access to the intermediate group lines 2.ZLe51 and 2.ZLe52.

However, if one of the intermediate lines 1.ZLe1 or 6 is idle, the circuits "39" and "40" will not be closed since one or the other of the contacts 45c6 or 46c1 is open. The intermediate subscriber line ZLt10 will be made available in the allotter LO11.

It will be assumed now that the intermediate line 1.ZLe1 is idle. In this case, the coupling relays (not shown in Fig. 7), namely, $Kg31^1$ (in the coupler GK3), $Kz1^{11}$ (in the coupler ZK11) and $Kt4^{10}$ (in the line coupler LK11), will energize. There are to be coupled two line conductors and one holding conductor. The coupling is accordingly effected by the closure of three sets of contacts, each having three contacts, of which only one of each set is shown, namely, contacts $130kt4^{10}$, $131kz1^{11}$, $132kg31^1$. The talking path between the relay set ER4 and the subscriber's line 21531 extends in a circuit 41. From the relay set ER4, coupling contacts 133k1, first intermediate line 1.ZLe1, coupling contacts $132kg31^1$, intermediate group line 2.ZLe41, coupling contacts $131kz1^{11}$, third intermediate line 3.ZLe1, intermediate subscriber line ZLt10, and coupling contacts $130kt4^{10}$ to the subscriber's line 21531.

The various P. B. X lines of a P. B. X group may also be distributed in all groups of a principal group.

Changes may be made within the scope and spirit of the appended claims.

I claim:

1. An automatic telephone system of the relay type comprising a plurality of groups of subscribers' lines forming a main group of lines, each of said groups containing a plurality of subgroups of lines, a plurality of switching devices for said main group, means for connecting a calling subscriber's line to one of said switching devices, a register, a marker, means in said switching device to which a calling subscriber's line has been connected and cooperating with means in said register and in said marker for selecting a called subscriber's line over said register and said marker to mark said line as a called line, a plurality of serially related couplers, a plurality of first, second and third intermediate lines extending respectively between said couplers, means for extending a talking path from said switching device to said called line over said serially related couplers and said intermediate lines, one of said serially related couplers being individual to the group of subscribers' lines containing the called line, and another one of said serially related couplers being operative to connect said switching device with any one of said first intermediate lines over said coupler which is individual to the group of lines containing the called line.

2. A system according to claim 1, in which said switching devices are subdivided into a plurality of groups, said last-named coupling means being individual to a group of switching devices, said first intermediate lines extending between said last named coupling means and said coupler which is individual to the respective line groups, further couplers respectively assigned to subgroups of lines, and intermediate lines extending between each coupler which is individual to a line group and all further couplers of said line group.

3. A system according to claim 2, in which the number of said first intermediate lines is equal to and the number of said intermediate lines assigned to a line group is smaller than the number of said switching devices assigned to said main group.

4. A system according to claim 2, wherein four of said second intermediate lines are accessible over two of said first intermediate lines, means for coupling said third intermediate lines directly with subscriber's lines, and coupling means for respectively interconnecting each pair of two of said second intermediate lines with one of said third intermediate line.

5. A system according to claim 4, wherein predetermined ones of said first intermediate lines which are connectable with corresponding second intermediate lines are preferentially taken into use in extending calls, and lockout relay means effective upon taking into use the predetermined first intermediate line for preparing the coupling circuit of the other first intermediate line which also has access to the second intermediate lines and for interrupting the coupling circuit of the associated first intermediate line so as to block the seizure of said first intermediate line.

6. A system according to claim 2, wherein predetermined ones of said second intermediate lines which are connectable with the same third intermediate line are preferentially taken into use in extending calls, and lockout relay means effective upon taking into use a predetermined secured intermediate line for preparing the coupling circuit of the other second intermediate line which also has access to the same third intermediate line and for interrupting the coupling circuit of the associated second intermediate group line so as to block the seizure of said second intermediate group line.

7. A system according to claim 2, comprising an allotter, a lockout relay in said allotter for each of said third intermediate lines for the purpose of preparing idle ones of said third intermediate lines for use, said lockout relay preventing upon blocking of an intermediate line the seizure of an idle second intermediate line which is connectable thereto.

8. A system according to claim 7, comprising an allotter, and locking relays in said allotter for preparing the seizure of idle third intermediate lines, said locking relays preventing the seizure of an idle second intermediate line if the first intermediate lines to which the idle second intermediate line has access is blocked by disconnecting this idle third intermediate line which has access to the idle second intermediate group line which is not to be used.

9. A system according to claim 8, wherein the same lockout relays which block busied third intermediate lines also disconnect free third intermediate lines if the accessible second intermediate lines are blocked.

10. A system according to claim 1, comprising allotters for said subgroups, said third intermediate lines accessible to said allotters and connectable with subscriber's lines, lockout relays for said third intermediate lines, said second intermediate lines accessible to said third intermediate lines, lockout relays for said second intermediate lines, circuit means for operating the last named lockout relays responsive to seizure of the respective intermediate lines associated therewith, and a circuit means controlled by the operated lockout relays for said second intermediate lines for preparing circuits for the energization of the lockout relays for said third intermediate lines only in an alloter associated with a subgroup in which a signal for extending a call is received.

11. A system according to claim 2, comprising a plurality of lockout initiating relays assigned to a group of subscribers lines, a signal associated with a group of said switching devices for controlling each of said lockout initiating relays, means in said marker for transmitting said signal after the impulse series corresponding to the wanted line has been received in said register, means controlled by the actuation of a lockout initiating relay for preparing circuits for the lockout relays of the group of second intermediate lines which are accessible to a group of said first intermediate lines, said circuits being closed only when said first intermediate lines are blocked.

12. A system according to claim 10, comprising a test relay in each of said switching devices, means for causing operation of said test relay when the selected subscriber line is found idle to close the circuit for the associated lockout initiating relay which is assigned to the group of lines comprising the selected line.

13. A system according to claim 11, comprising a further relay which is operable jointly with said lockout initiating relay, said further relay initiating the coupling of said switching device which has been seized by the calling line with an idle first intermediate line.

14. A system according to claim 10, comprising a lockout-initiating relay for each line group accessible to said switching device over said intermediate lines, tens relays in said marker responsive to the tens digits of called subscriber's lines, circuit means for subdividing the contacts of said tens relays in groups in parallel relationship, the closure of predetermined ones of said contacts determining the line group containing a called subscriber to determine the energization of the respective lockout-initiating relay.

15. A system according to claim 11, comprising a lockout-initiating relay for each line group accessible to said switching device over said intermediate lines, said marker responsive to dialled digits of called lines, and circuit means for energizing said lockout initiating relays in accordance with lines to which calls are to be extended, said circuit means comprising tens relays for marking the groups containing selected subscriber's lines, an auxiliary relay common to a group of tens relays, and circuit means controlled by the energized auxiliary relay for controlling the operation of a lockout-initiating relay for the line group containing the selected line.

16. A system according to claim 11, comprising an allotter for each of said subgroups of lines, and relay means in said allotters responsive to the extension of a call to the associated subgroup for closing the circuit of the lockout-initiating relay associated with the respective line group.

17. A system according to claim 15, comprising an allotter for each of said line groups, a lockout-initiating relay in said allotter for each group of said switching devices, and circuit means for said lockout-initiating relay which by-pass couplers in the final selection stage.

18. A system according to claim 1, comprising a P. B. X group, the lines of said P. B. X group being disposed in different line groups each of which is subdivided in subgroups, a coupler in each line group, an allotter for each subgroup of lines, and relay means in said allotters responsive to the extension of calls thereto for switching the setting up of such calls over the associated coupler.

References Cited in the file of this patent

UNITED STATES PATENTS

| | | |
|---|---|---|
| 2,541,624 | Voss | Feb. 13, 1951 |
| 2,552,792 | Jones | May 15, 1951 |
| 2,574,944 | Voss | Nov. 13, 1951 |
| 2,621,257 | Voss et al. | Dec. 9, 1952 |
| 2,625,610 | Joel | Jan. 13, 1953 |